United States Patent [19]
Adams et al.

[11] Patent Number: 5,837,398
[45] Date of Patent: Nov. 17, 1998

[54] RADIATION CURABLE SEALING MATERIAL FOR BATTERIES

[75] Inventors: John E. Adams; Kazuhiro Hirabayashi; Toru Takeoka, all of Cincinnati, Ohio

[73] Assignee: Three Bond Co., Ltd., Hachioji, Japan

[21] Appl. No.: 936,407

[22] Filed: Sep. 25, 1997

Related U.S. Application Data

[60] Provisional application No. 60/026,725 Sep. 26, 1996.

[51] Int. Cl.$^6$ ....................................................... H01M 2/08
[52] U.S. Cl. ............................................ 429/174; 429/185
[58] Field of Search ..................................... 429/171–174, 429/185

[56] References Cited

U.S. PATENT DOCUMENTS

| | | | |
|---|---|---|---|
| 3,713,896 | 1/1973 | Feldhake | 136/133 |
| 3,836,400 | 9/1974 | Strauss et al. | 429/174 |
| 3,922,178 | 11/1975 | Winger | 136/133 |
| 4,220,695 | 9/1980 | Ishida et al. | 429/172 |
| 4,240,197 | 12/1980 | Hamsag | 429/174 X |
| 4,256,828 | 3/1981 | Smith | 430/280 |
| 4,282,293 | 8/1981 | van Lier | 429/185 |
| 4,384,030 | 5/1983 | LeDuc et al. | 429/174 |
| 4,485,157 | 11/1984 | Moseley | 429/251 |
| 4,618,547 | 10/1986 | Markin | 429/174 |
| 4,740,435 | 4/1988 | Markin et al. | 429/174 |
| 5,008,161 | 4/1991 | Johnston | 429/7 |
| 5,080,984 | 1/1992 | Thibault et al. | 429/94 |
| 5,324,332 | 6/1994 | Jacus et al. | 29/623.2 |
| 5,332,633 | 7/1994 | Adamson et al. | 429/174 |

FOREIGN PATENT DOCUMENTS

| | | |
|---|---|---|
| 56-152161 | 11/1981 | Japan . |
| 56-165264 | 12/1981 | Japan . |

*Primary Examiner*—Anthony Skapars
*Attorney, Agent, or Firm*—Frost & Jacobs LLP

[57] ABSTRACT

The present application discloses battery sealant compositions which exhibit excellent flexibility and chemical (alkalinity) resistance properties without requiring the use of organic solvents. These compositions comprise an epoxy resin, such as polybutadiene epoxy resin; a polyol material, such as a butadiene polyol; a cationic photoinitiator; and optionally a radiation curable monomer, such as a vinyl ether monomer. Electrochemical (battery) cells which incorporate a seal made by the photoinitiated polymerization of this material is is also disclosed.

7 Claims, 1 Drawing Sheet

U.S. Patent    Nov. 17, 1998    5,837,398

RADIATION CURABLE SEALING MATERIAL FOR BATTERIES

BACKGROUND OF THE INVENTION

This application is based on U.S. Provisional Patent Application Ser. No. 60/026,725, Adams, Hirabayashi and Takeoka, filed Sep. 26, 1996.

A battery seal, usually in combination with a nylon grommet or gasket, serves the purpose of keeping the electrolyte solution of the anode from coming in contact with elements of the cathode, thus preventing premature battery discharge. The sealing element must also serve the function of an electrical insulator preventing a short between the battery case (cathode) and the anode collector (anode nail).

It is desirable to provide a cell sealant which is easy to apply by automatic dispensing techniques, that is initially a liquid of a low viscosity, but becomes a flexible elastomeric material, and retains its flexibility and resists leakage of electrolyte into the cathode.

A feature of many battery sealants commonly used in commercial production is the use of organic solvents (MEK, toluene, xylenes, etc.) to reduce the viscosity of sealant polymer solutions to a suitable low viscosity range (typically 175 to 250 cPs). The concentration of volatile organic solvent in these products is frequently 40% to 60% (and sometimes as much as 90%) by weight in sealant solution, and must be largely removed by evaporation from the sealant in the drying process. This widespread use of organic solvent-containing sealants represents a significant hazard to the work place and the natural environment. Abatement measures used to reduce the amount of fugitive solvent release into the environment are expensive and only partially protect workers in the immediate area of sealant application. Solvent-containing battery sealants are the major source of hazardous air pollutants (HAP's) from battery manufacturing plants.

Conventional sealing materials are liquid solutions of a solid material in a suitable organic solvent. Specific examples of the sealing material include polyamides (e.g., Nylon 6, Nylon 66, Nylon 610, Nylon 11, Nylon 12), polyethylenes, polypropylenes, styrene resins, fluororesins, rubbery materials, pitch, fatty polyamides, rubbery adhesives (e.g., chloroprene rubber, nitrile rubber, silicone rubber, butyl rubber), silicone oils, etc. Among them, preferred are pitch, fatty polyamides, rubber adhesives and silicone oils.

U.S. Pat. No. 3,922,178, Winger, issued Nov. 25, 1975, discloses a means for sealing alkaline batteries which comprises the use of a polyamide, specifically a fatty polyamide, as a seal or protective coating to prevent alkaline electrolyte from wetting certain surfaces within the cell. U.S. Pat. No. 3,713,896, Feldhake, issued Jan. 30, 1973, discloses an insulating seal for alkaline cells which consists of a layer of cured epoxy-polyamide resin located and compressed between a metallic container and a metallic cover. The above two patents teach many types of coatings or layers of various materials, such as polyamides, epoxy resins, asphalts and cured epoxy-polyamide resins, all of which contain various amounts of organic solvent to reduce the application viscosity of the sealant. While these type of sealants on gaskets form adequate seals at metal-gasket interfaces of alkaline cells, an object of the present invention is to provide high speed UV curing sealants which do not require the use of such solvents.

U.S. Pat. No. 4,220,695, Ishida, et al., issued Sep. 2, 1980, describes a process for achieving a more leak-resistant, alkali-resistant plastic closure element used in an alkaline battery by controlling its moisture content to below 0.3 weight %. It is taught that the sealant used in combination with the plastic closure element enhances the seal.

U.S. Pat. No. 4,282,293, Van Lier, issued Aug. 4, 1981, describes a method for pre-treating the metal surface of an alkaline battery case with an organosilane coupling agent. When this pre-treatment is applied, better sealing properties are reported with solvent-reduced battery sealants such as polyamides, epoxy resins, asphalts and cured epoxy-polyamide resins.

Japanese Patents 56-165264 and 56-152161 (Yuasa Battery Co., Ltd.) describe the use of acrylate-functional acrylic, epoxy and cyanoacrylate resins to make flexible sealants for use in electrochemical cells that cure via a free radical mechanism by ultra-violet light. These sealants when applied to both the cathode and anoidic sides of the gasket are said to prevent leakage of the electrolyte between the two sides of the cell and improve battery shelf-life. No examples of non-solvent containing sealants are detailed in the patents. If these inventions are used with an alkaline battery, they are found not to have resistance to the alkaline electrolyte solution. The present invention is based on cationic cure mechanisms and is found to have substantially better resistance to caustic electrolyte solutions of alkaline batteries than the aforementioned inventions.

U.S. Pat. No. 4,485,157, Mosely, issued Nov. 11, 1984, describes the use of a cured silicone dielectric resin that, when used in combination with a plastic separator or gasket composed of high molecular weight polyethylene filled with approximately fifty percent silica filler, is said to form a leak resistant seal in a metal halide battery (i.e., zinc bromide).

U.S. Pat. No. 4,384,030, Bellino, et al., issued May 17, 1983, describes an improvement to the diluting solvent composition that was found to improve the leak resistance of asphalt type sealants. This sealant is based on organic solvent for workable viscosity ranges during application.

U.S. Pat. No. 4,618,547, Markin, issued Oct. 21, 1986, describes a blend of two thermoplastic resins that, when dissolved in an organic solvent, cast and dried, is said to result in a non-tacky material having good sealant properties. This invention requires significant amounts of chlorinated solvent to have a workable viscosity range.

U.S. Pat. No. 4,740,435, Book, et al., issued Apr. 26, 1988, discloses sealant material generally for application to an insulating closure member in electrochemical cells, typically alkaline cells. The reference example discloses the use of rubber additives between 0.5% to 10% by weight in an asphalt to provide a solvated sealant mixture that is more elastic without losing its adhesive properties. All of the sealant formulations discussed in this reference include significant amounts of organic solvents as components.

U.S. Pat. No. 5,008,161, Johnston, et al., issued Apr. 16, 1991, describes a new battery construction that uses a tab bonded to the anode terminal to get a good seal.

U.S. Pat. No. 5,324,332, Jacus, et al., issued Jun. 28, 1994, describes a process for sealing an alkaline battery cell by placing a hot melt thermoplastic material in the bottom of the cell followed by placing the separator tube on top of the still molten hot melt. The separator tube serves to electrically separate the two sides of the electrochemical cell. The use of the hot melt in combination with the separator is claimed to provide a better seal. The use of this material to seal the top closure element is not described.

U.S. Pat. No. 5,332,633, Adamson, et al., issued Jul. 26, 1994, describes a thermoplastic hot melt that forms a good seal for the current collector nail that enters through a closure element, or gasket, to close the open end of an electrochemical cell. The use of this material to seal the top closure element is not described.

U.S. Pat. No. 4,256,828, Smith, issued Mar. 17, 1981, describes photocopolymerizable compositions which contain epoxides, an organic material with a hydroxyl functionality and a photoinitiator. The compositions are said to form durable coatings; use in an alkaline battery context is not disclosed.

It is an object of the invention to provide a sealant material which can adequately seal interfacial spaces within an electrochemical cell, without the emission of organic solvents into the environment during the manufacturing, curing or drying process.

It is an object of the invention to provide a sealant which adequately seals interfacial spaces within an electrochemical cell, as compared to conventional solvent-containing battery seals. Specifically, batteries made using the present invention will perform well, and will not prematurely fail, even if the cell is exposed to hot, humid conditions.

SUMMARY OF THE INVENTION

The present invention encompasses battery sealant compositions, which have excellent flexibility and chemical resistance without requiring the use of organic solvents, comprising an epoxy resin (preferably a polybutadiene epoxy resin) and a polyol material having a hydroxyl functionality of at least 2 and a hydroxyl equivalent weight of from about 100 to about 5,000 (preferably a butadiene polyol), and wherein the epoxy resin and the polyol are used in amounts such that their epoxy resin to polyol equivalence ratio is from about 4 to about 30, together with from about 0.1% to about 4% of a cationic photoinitiator, and from 0 to about 25% of a radiation curable monomer.

The present invention also encompasses electrochemical cells which include, between their anode and cathode portions, a seal which comprises the photoinitiated polymerization product of the above sealant compositions.

DETAILED DESCRIPTION OF THE INVENTION

Figure 1:
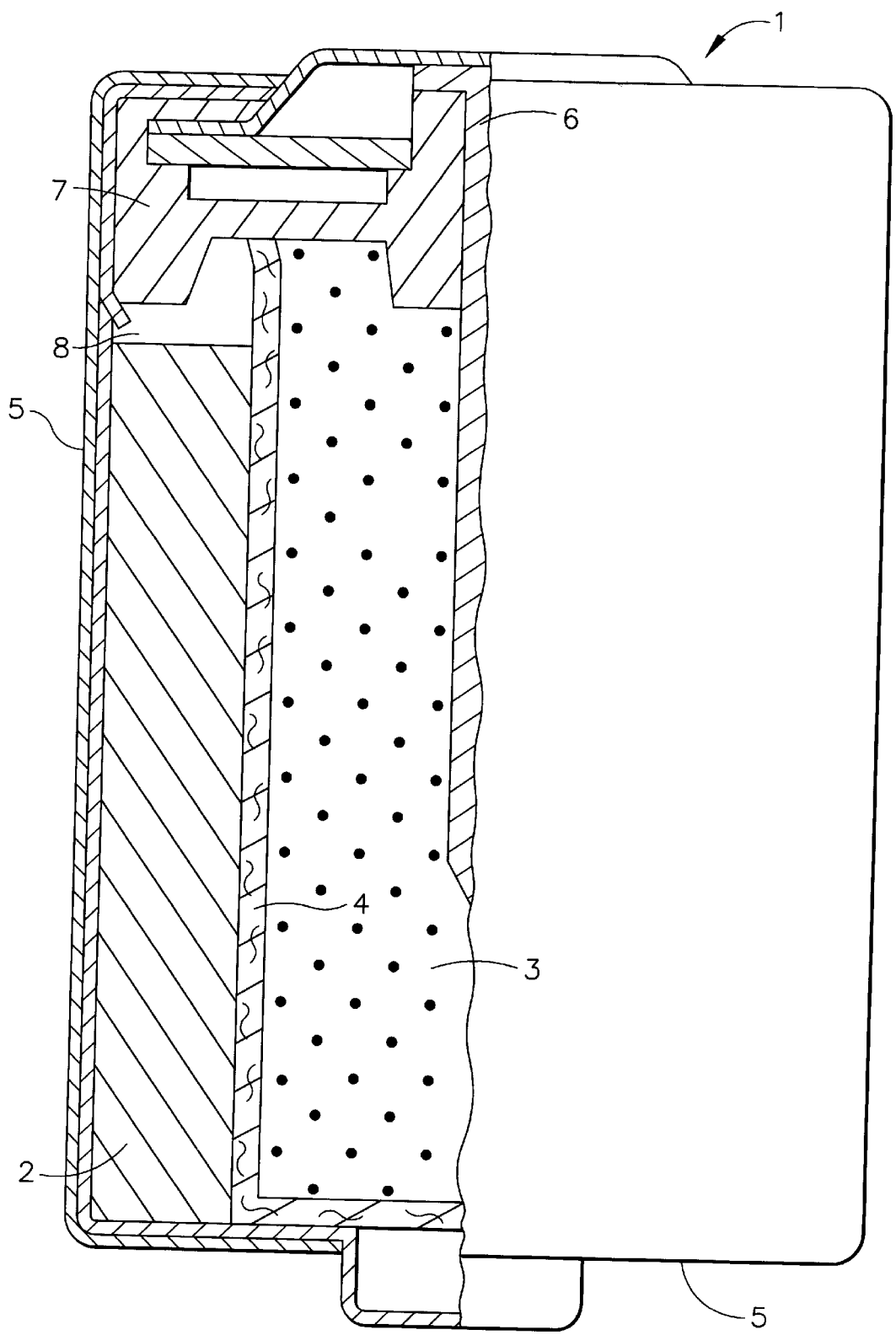
FIG. 1 is a cut-away plan view showing the parts of a typical electrochemical cell.

The present invention relates to a sealant useful in the construction of electrochemical cells or batteries. An example of such a cell is shown in FIG. 1. Conventional electrochemical cells, particularly alkaline cells, 1, are sealed by employing an insulating closure member such as a plastic gasket or grommet, 7. During cell assembly, this member is placed in the open end of the cell casing, 5, and is crimped in place. A sealant material 8, is typically applied between the peripheral surface of the closure member, 7, and the cell casing, 5, to assure that there is a tight seal therebetween and that no electrolyte material can escape. In alkaline cells, an anode current collector, which is a conductive metallic nail or pin, 6, is normally inserted through the insulating closure member, 7, and into the anode active material, 3. The opposite end of the nail or pin seated in the closure member forms the cell's anode terminal. The anode is insulated from forming an electrical short with the cathodically charged metal cell case, 5, and the cathode material, 2, by the presence of the closure member, 7, and sealant, 8, as well as the separator, 4.

The present invention provides, therefore, a sealant between the anode and cathode portions of an electrochemical cell (battery). The sealant is prepared by mixing an epoxy resin, a polyol, a photoinitiator and, optionally, a monomer. Any epoxy resin capable of undergoing polymerization by an internally photogenerated cationic initiator may be used. Examples of such resins include aromatic epoxy resins, like bisphenol A, bisphenol F, phenolic and cresolic epoxy resins; aliphatic epoxy resins, such as cycloaliphatic epoxy resins, polybutadiene epoxy resins, epoxidized polyols of polymer backbones composed of copolymers and terpolymers of isoprene, butadiene, ethylene, butylene and styrene (for example, those commercially available from Shell as Epoxidized Krayton Polymers), and mixtures thereof. The resins which provide optimum viscosity and reactivity include cycloaliphatic epoxy resins, polybutadiene epoxy resins and mixtures thereof, with polybutadiene epoxy resins being especially preferred.

The cycloaliphatic epoxy resins are preferred because they provide faster reactivity and lower viscosity to the sealant composition. The polybutadiene epoxy resins are preferred because they provide flexibility and chemical resistance to the seal. These two preferred resins may be mixed together in appropriate proportions in the composition to optimize the properties of the final product.

The polyol component enhances flexibility of the sealant necessary for good sealing characteristics. The selection of an appropriate polyol is critical for achieving proper alkaline resistance. For example, polyester backbone polyols, such as those commercially available from Union Carbide as Tone Polyols 301, 305 and 310, may not provide adequate caustic resistance. In contrast, polyols having a polyether backbone, such as Acclaim 6300, Acclaim 4200, Arcol PPG 425 and Arcol PPG 1025, commercially available from Arco Chemical Company, exhibit good caustic resistance. The functionality of the polyol should be at least 2. A hydroxyl functional oligomer with functionality significantly less than 2, 1 for example in the case of a monol, will provide sealants having poor chemical resistance. The molecular weight of the hydroxyl functional material is also very important. Materials having hydroxyl equivalent weights less than about 100 grams per mole will result in sealants having poor flexibility and chemical resistance. Oligomers with hydroxyl equivalent weights greater than about 5,000 grams per mole will generally not be useful because of polymer-polymer immiscibility issues. Preferred polyol materials include those which are di- or tri-hydroxy functional polyether polyols, and polybutadiene polyols, and (non-epoxidized) polyols with polymer backbones composed of copolymers and terpolymers of isoprene, butadiene, ethylene, butylene and styrene. Aliphatic polyether polyols and polybutadiene polyols are preferred polyol materials for use in the present invention. Mixtures of these materials are particularly preferred. Aliphatic polyether polyols are particularly preferred because they serve as cross-linkers for the epoxy resin component, forming branched structures which result in better chemical resistance for the finished seal. In formulating a sealant composition of the present invention, it is preferred to select as the polyol component the polyol precursor to the epoxy resin included in the composition. For example, the polybutadiene polyols work well with the polybutadiene epoxy resins.

Any cationic photoinitiator (photo acid generator) may be used in the compositions of the present invention. An extensive disclosure of such photoinitiators is included in U.S. Pat. No. 4,256,828, Smith, issued Mar. 17, 1981, incorporated herein by reference. Photoinitiators activated by UV light are preferred. In selecting a photoinitiator for use with a particular resin system, the photoinitiator should be one which provides a flexible product, together with a good depth of cure. The fastest photoinitiator combinations frequently do not meet these criteria. Examples of photoinitiators which may be used in the present invention include aliphatic substituted diaryliodonium salts, such as those based on hexafluoroantimonate salts (e.g., General Electric UV-9380 and GE 479-2092C, Sartomer CD1012 and Rhone Poulenc Chemie Silcolase UV Cata 200), and triarylsulfonium hexafluorophosphate and triarylsulfonium hexafluoroantimonate (e.g., Union Carbide UV1-6990 and UV1-6974). Ferrocenium salts like ($\eta^5$-2,4-cyclopentadien-1-yl)($\eta^6$-isopropyl benzene)-iron (III) hexafluorophosphate are also useful as a cationic photoinitiator (Irgacure 261, Ciba Geigy). A particularly preferred photoinitiator is a triarylsulfonium-phosphate salt:

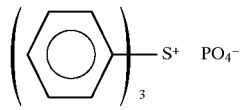

Most of the cationic photoinitiators described above make the most efficient use of UV wavelengths below 300 nm. However, most commercially available UV light sources are based on high pressure mercury spectra that have their greatest output intensity above 350 nm. Because of this, co-initiators that make use of higher UV wavelengths and the near visible spectrum serve a useful purpose for making cationic photoinitiators more effective at lower concentrations. Examples of co-initiators that can be used in this capacity include 2-isopropylthioanthone and chloroisopropylthioxanthone.

A monomer component may be utilized in the compositions of the present invention to reduce viscosity and optimize cure speed of the sealant mixture. Any radiation curable monomer with vinyl unsaturation or a thiol functionality may be used. Vinyl ether monomers, such as 1,4-bis[(vinyloxy)methyl] cyclohexane (ISP Technologies Rapi-Cure CHVE) and 3,6,9,12-tetraoxatetradeca-1,13-diene (ISP Technologies Rapi-Cure DVE-3) are particularly preferred.

The sealant compositions of the present invention contain the epoxy resin and the polyol components in amounts such that the epoxy-hydroxyl equivalence ratio, calculated as shown below, is from about 4 to about 30, preferably from about 10 to about 18. This ratio is calculated using the following formula $$\frac{\text{(grams of epoxy resin)/}}{\text{(epoxy equivalent weight in epoxy resin)}}$$
$$\frac{\text{(grams of hydroxyl functional material)/}}{\text{(hydroxyl equivalent weight in hydroxyl functional material)}}$$

In addition, the compositions contain from about 0.1% to about 4%, preferably from about 0.8% to about 1.8% of the photoinitiator. The monomer component comprises from about 0% to about 25%, preferably from about 1% to about 10%, most preferably about 5% of the finished sealant composition.

Optional components, such as wetting agents, defoamers, dyes, (including fluorescent dyes which can be used on high speed production lines to show the presence of the sealant), and fillers (including micronized rubbers), may be included at their art-established levels to improve the functionality and the in-use properties of the sealant compositions of the present invention.

The sealant composition will generally have a viscosity in the range of from about 175 to about 2,000 centipoise, preferably from about 175 to about 450 centipoise. This viscosity will permit the sealant to be used effectively in high-speed automated battery manufacturing processes. It is important to note that this is accomplished in the present invention without using any volatile organic solvents. In fact, the compositions of the present invention are substantially free of such organic solvents (i.e., organic solvents comprise less than about 0.5% of the compositions). The sealant mixture is then applied to the battery, as described above, and the mixture is cured using, for example, UV light. The seal formed is strong, yet flexible. It adheres well to the battery (for example, nylon, brass and nickel-plated steel) and performs its sealing function effectively.

All percentages and ratios defined herein are "by weight" unless otherwise specified.

Practical and preferred embodiments of this invention are illustrated in the following non-limiting examples wherein percentages and part(s) are "by weight," unless otherwise indicated. These examples are intended to be illustrative only and are not intended to be limiting on the scope of the present invention.

EXAMPLES 1

A sealant material of the present invention is prepared using: (a) cycloaliphatic epoxy resin, (b) polybutadiene epoxy resin, (c) polyol, (d) vinyl ether monomer, and (e) cationic photoinitiator.

The low VOC sealant composition is formed by mixing the following raw materials: 57.9 grams of Cyracure UVR-6110 (cycloaliphatic epoxy resin commercially available from Union Carbide), 17.8 grams PBD 600 (polybutadiene epoxy resin commercially available from Elf Atochem North America), 17.8 grams R20LM (polybutadiene polyol, commercially available from ISP Technologies, Inc.), 4.7 grams DVE-3 (divinyl ether monomer, commercially available from ISP Technologies, Inc.), and 1.8 grams Cyracure UVI-6990 photoinitiator (commercially available from Union Carbide).

To a D-size battery case, approximately 55 mg to 80 mg of the non-volatile uncured sealant is applied in continuous bead fashion to the topside of the lip. This lip will form the sealing surface for a Nylon 610 closure element. The underside of the Nylon closure element can, optionally, also be coated with the sealant in a separate operation. When exposed to UV light, the sealant mixture forms a strong, flexible, effective seal.

EXAMPLE 2

The excellent properties of the sealant compositions of the present invention were demonstrated as follows.

Three sealant compositions, having the formulations given below, were prepared. Composition A is a composition of the present invention. Compositions B and C are of the type described in Japanese Patents 56-165264 and 56-152161.

| Components | Compositions (% by weight) | | |
|---|---|---|---|
| | A | B | C |
| Cyracure UVR-6110 (Union Carbide) | 57.0 | — | — |
| PBD600 - epoxidized polybutadiene resin (Elf Atochem North America) | 17.5 | — | — |
| R20LM - hydroxyl functional polybutadiene resin (Elf Atochem North America) | 12.8 | — | — |
| PPG-425 (Arco Chemical Company) | 5.9 | — | — |

-continued

| Components | Compositions (% by weight) | | |
|---|---|---|---|
| | A | B | C |
| DVE-3 (divinyl ether monomer) | 5.0 | — | — |
| UVI-6990 (photoinitiator - Union Carbide) | 1.8 | — | — |
| Ebecryl 3604 - rubber modified epoxy acrylate resin (Radcure) | — | 54.39 | — |
| Puralast 186 - urethane acrylate resin (Polymer Systems) | — | — | 56.54 |
| D 1173 - free radical photoinitiator (Ciba Geigy) | — | 5.11 | 5.06 |
| Phenoxyl Ethyl Acrylate - acrylate functional monomer (Sartomer) | — | 40.41 | 38.32 |
| Silwet 7602 - surfactant wetting agent | — | 0.10 | 0.07 |

The compositions were prepared by mixing the respective raw materials together until all components were completely dissolved and the blend was homogeneous.

The ability of a seal formed from these compositions to withstand an alkaline environment (similar to the one present in an electrochemical cell) was tested using the following procedure:

Approximately 1 gram of each prepared liquid sample was poured individually onto a flat Teflon sheet forming approximately a disk shape. The liquid sample on the sheet was then passed under a high pressure mercury UV light source. Each sample received approximately 4,000 mJ/cm$^2$ of UV energy as weighted in UV-A. After UV cure, the solid-rubbery disk-shaped samples were peeled from the Teflon sheet. Each cured test piece was then placed into a beaker containing 40% by weight potassium hydroxide solution under stirring agitation.

Four samples of each composition were tested then under two sets of conditions. The higher temperature experiment (I) represents a significantly more severe test than the lower temperature conditions. The weight loss from the test samples was measured and the mean from all four test samples calculated. A smaller weight loss represents a seal material exhibiting better alkalinity resistance properties.

I. 30 minutes at 85°–90° C. with agitation

| Composition | Sample | Coupon weight | +seal | after treatment | % loss |
|---|---|---|---|---|---|
| A | 1 | 21.6682 | 23.3869 | 23.2363 | −8.8 |
| | 2 | 20.8910 | 22.5972 | 22.4657 | −7.7 |
| | 3 | 21.2342 | 22.6641 | 22.4993 | −11.5 |
| | 4 | 22.4930 | 23.7370 | 23.6309 | −8.5 |
| | | | | Mean | −9.1 |
| B | 1 | 19.5965 | 21.1455 | 19.5965 | −100.0 |
| | 2 | 19.8196 | 20.9867 | 19.8196 | −100.0 |
| | 3 | 19.7420 | 20.5755 | 19.7420 | −100.0 |
| | 4 | 20.9521 | 22.0736 | 20.9521 | −100.0 |
| | | | | Mean | −100.0 |
| C | 1 | 22.5454 | 24.0297 | 22.5454 | −100.0 |
| | 2 | 23.2221 | 25.0980 | 23.2221 | −100.0 |
| | 3 | 20.1025 | 21.4938 | 20.9923 | −36.0 |
| | 4 | 20.3784 | 21.9013 | 20.8982 | −65.9 |
| | | | | Mean | −51.0 |

II. 1 hour at 70° C. with agitation

| Composition | Sample | Coupon weight | +seal | after treatment | % loss |
|---|---|---|---|---|---|
| A | 1 | 15.6182 | 16.4716 | 16.4153 | −6.6 |
| | 2 | 16.1347 | 17.2753 | 17.2097 | −5.8 |
| | 3 | 15.6569 | 16.3105 | 16.2576 | −8.1 |
| | 4 | 16.2077 | 16.8943 | 16.8462 | −7.0 |
| | | | | Mean | −6.9 |
| B | 1 | 16.2072 | 17.2780 | 16.2072 | −100.0 |
| | 2 | 15.4466 | 16.4965 | 15.4466 | −100.0 |
| | 3 | 16.6147 | 17.8646 | 16.6147 | −100.0 |
| | 4 | 15.9317 | 17.0970 | 15.9317 | −100.0 |
| | | | | Mean | −100.0 |
| C | 1 | 15.8285 | 16.6415 | 16.3724 | −33.1 |
| | 2 | 15.6003 | 16.5689 | 16.2485 | −33.1 |
| | 3 | 15.1009 | 15.8837 | 15.7152 | −21.5 |
| | 4 | 15.8572 | 16.7582 | 16.5808 | −19.7 |
| | | | | Mean | −20.6 |

In this test, the composition of the present invention was clearly superior to the prior art sealants tested, and exhibited excellent alkalinity resistance properties for a battery sealant, particularly one which is free of organic solvents.

What is claimed is:

1. An electrochemical cell which includes between its anode and cathode portions a seal which comprises the photoinitiated polymerization product of a sealant composition which comprises an epoxy resin capable of undergoing polymerization by internally photogenerated cationic initiation and a polyol material having a hydroxyl functionality of at least 2 and a hydroxyl equivalent weight of from about 100 to about 5,000, and wherein the epoxy resin and polyol are used in amounts such that their epoxy-polyol equivalence ratio is from about 4 to about 30, together with from about 0.1% to about 4% of a cationic photoinitiator, and from 0 to about 25% of a radiation curable monomer.

2. The electrochemical cell according to claim 1 wherein the sealant composition additionally comprises from about 1% to about 10% of said radiation curable monomer.

3. The electrochemical cell according to claim 2 wherein the epoxy resin is selected from the group consisting of cycloaliphatic epoxy resins, polybutadiene epoxy resins, and mixtures thereof.

4. The electrochemical cell according to claim 3 wherein the polyol is selected from the group consisting of aliphatic polyether polyols, polybutadiene polyols, and mixtures thereof.

5. The electrochemical cell according to claim 4 wherein the monomer is a vinyl ether monomer.

6. The electrochemical cell according to claim 5 wherein the cationic photoinitiator is a triarylsulfonium phosphate salt.

7. The electrochemical cell according to claim 1 wherein the sealant composition is substantially free of organic solvents.

* * * * *